United States Patent [19]
Haavisto et al.

[11] Patent Number: 5,018,811
[45] Date of Patent: May 28, 1991

[54] ASYMMETRIC OPTICAL WAVEGUIDES FOR MINIMIZING BENDING LOSSES AND TECHNIQUES FOR FABRICATING SAME

[75] Inventors: John R. Haavisto, Scituate; Edward P. Ayers, Hingham, both of Mass.

[73] Assignee: Northrop Corporation, Hawthorne, Calif.

[21] Appl. No.: 555,202

[22] Filed: Jul. 18, 1990

[51] Int. Cl.$^5$ .................. G02B 6/10; H01L 21/70
[52] U.S. Cl. ............... 350/96.12; 350/96.11; 350/96.15; 350/96.31; 350/320; 437/21; 437/22; 437/51
[58] Field of Search ............ 350/96.11, 96.12, 96.15, 350/96.17, 96.30, 96.31, 320; 437/16, 20, 21, 22, 36, 51

[56] References Cited

U.S. PATENT DOCUMENTS

| | | | |
|---|---|---|---|
| 3,923,373 | 12/1975 | Dabby et al. | 350/96.14 X |
| 4,396,246 | 8/1983 | Holman | 350/96.14 |
| 4,630,885 | 12/1986 | Haavito | 350/96.15 |
| 4,787,689 | 11/1988 | Korotky | 350/96.12 |
| 4,810,049 | 3/1989 | Fischer et al. | 350/96.12 |
| 4,906,062 | 3/1990 | Young | 350/96.12 |
| 4,978,188 | 12/1990 | Kawachi et al. | 350/96.12 |
| 4,983,499 | 1/1991 | Suzuki et al. | 350/96.12 X |

OTHER PUBLICATIONS

Neumann et al., "Sharp bends with low losses in dielectric optical waveguides" Appl. Optics vol. 22, No. 7 4/83, pp. 1016–1022.

*Primary Examiner*—Brian Healy
*Attorney, Agent, or Firm*—Terry J. Anderson; Robert B. Block; Karl J. Hoch, Jr.

[57] ABSTRACT

A generally circular or elliptical waveguide (2) is fabricated within a substrate (3) such that the waveguide is surrounded by two different indices of refraction, with the index inside the waveguide ring being greater than the index outside the ring. This results, in combination with a varying index of refraction profile across the width of the waveguide inself, in a tendency to confine mode energy away from the outer perimeter of the waveguide ring where leakage is most likely to occur. As a result the asymmetrical index profile compensates for the curvature of the waveguide, wave phase front velocities are made uniform, and the mode energy remains confined within the waveguide. A two step ion exchange technique is disclosed for selectively increasing the index of refraction of the substrate and for forming the variable index of refraction profile within the waveguide.

16 Claims, 2 Drawing Sheets

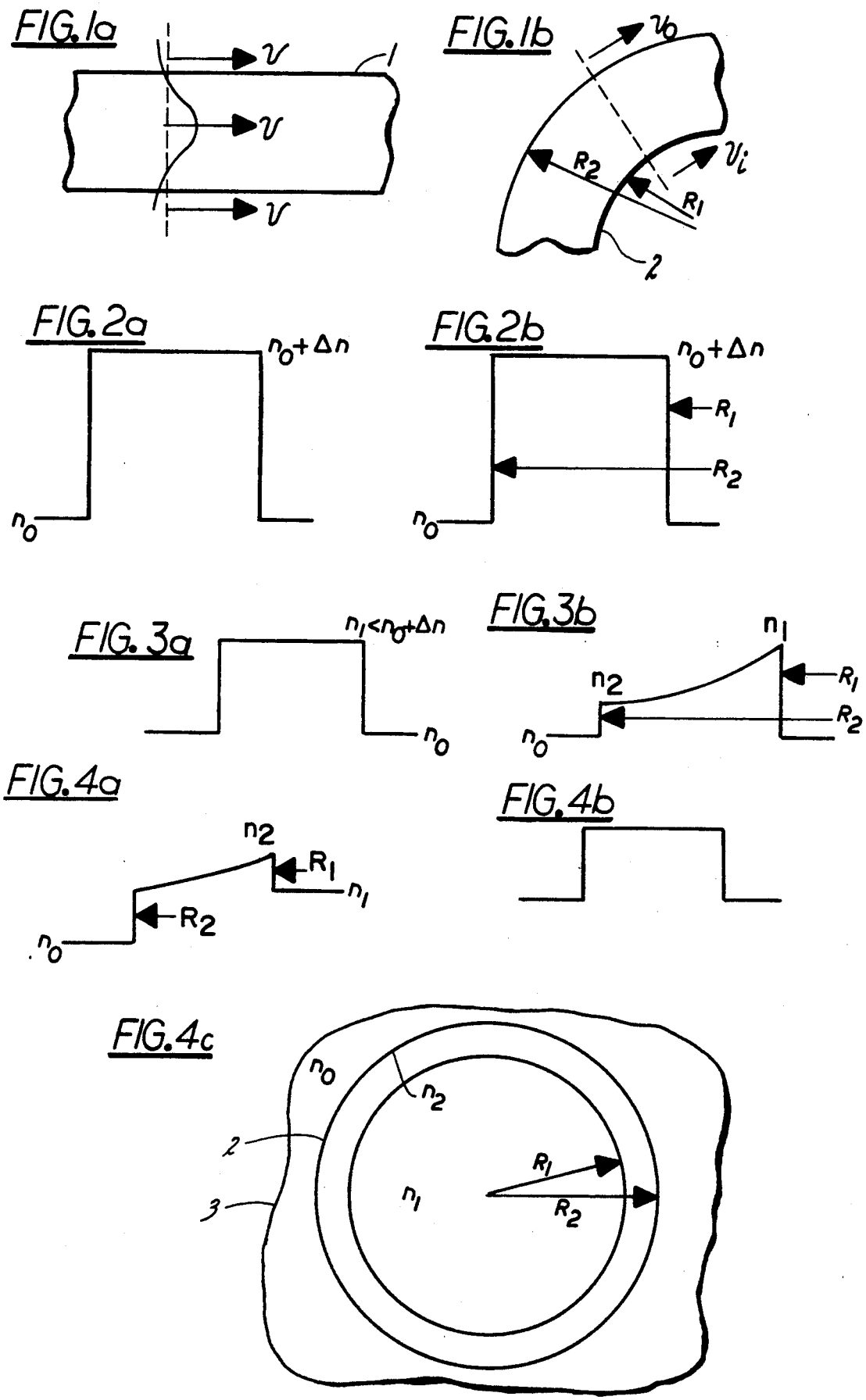

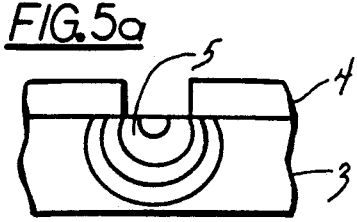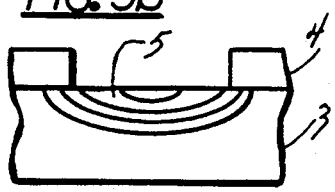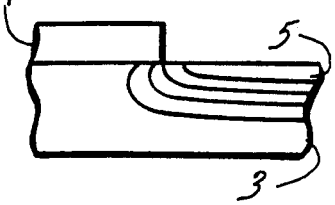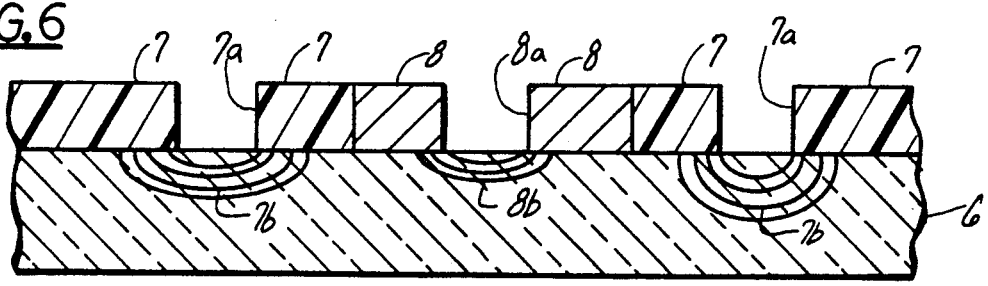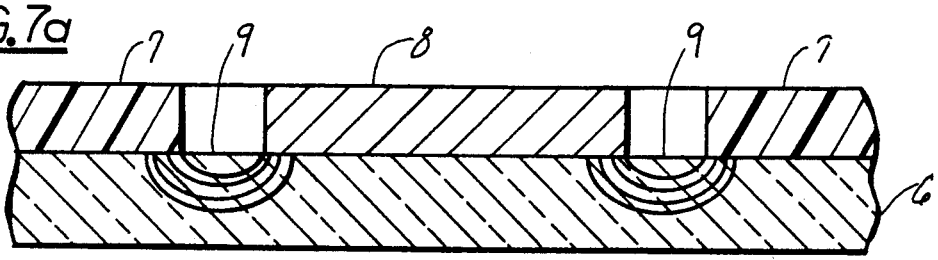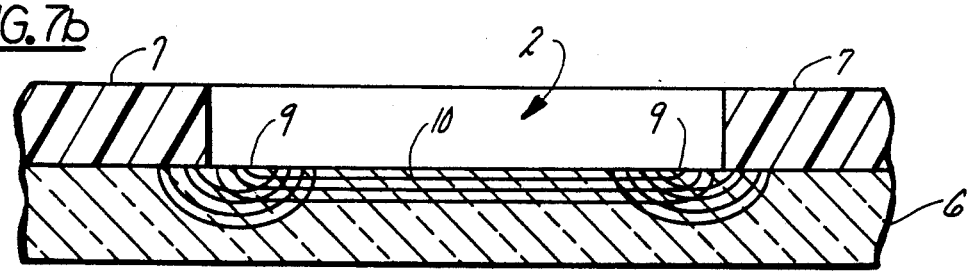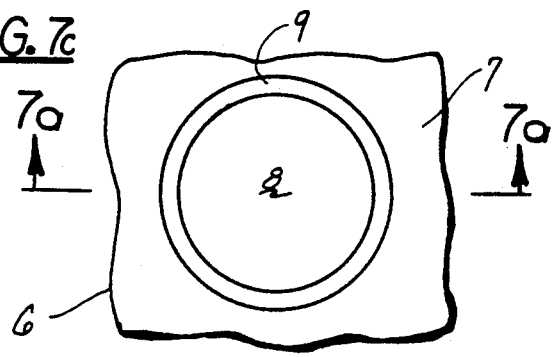

ASYMMETRIC OPTICAL WAVEGUIDES FOR MINIMIZING BENDING LOSSES AND TECHNIQUES FOR FABRICATING SAME

FIELD OF THE INVENTION

This invention relates generally to optical waveguides and, in particular, to optical waveguides having an asymmetric index of refraction profile for minimizing radiation losses due to bending of the waveguide. This invention also relates to methods for fabricating optical waveguides having an asymmetric index of refraction profile.

BACKGROUND OF THE INVENTION

Bending loss is known to limit the performance of optical waveguides when configurations with sharp bends or small radii are required. Single mode waveguides, used extensively in integrated optics applications, are particularly susceptible to bending loss.

Bending loss occurs when the mode travelling in a curved waveguide couples to radiation modes outside the waveguide, resulting in a loss of energy from the waveguide. Coupling occurs when the phase velocity of the energy travelling in the bend matches the phase velocity outside the waveguide. FIG. 1a illustrates a straight section of waveguide 1 and shows that a wavefront phase velocity (v) of a guided mode is equal across the waveguide. As shown in FIG. 1b for a curved waveguide 2 the phase velocity of the guided mode is proportional to the radius of curvature ($R_1$ or $R_2$ each measured to a point on the surface of the substrate) in that the outer-most portion of the mode must travel faster ($v_o$) than the inner-most portion of the mode ($v_i$) in order to preserve the phase front. The speed of the waveguide mode goes inversely with the effective index of refraction ($n_{eff}$).

FIG. 2a and FIG. 2b illustrate the actual waveguide index of refraction profiles corresponding to the waveguides of FIG. 1a and FIG. 1b, respectively, and FIGS. 3a and 3b illustrate the effective index of refraction profile for the waveguides of FIG. 1a, FIG. 1b and FIG. 2a, FIG. 2b, respectively. As can be seen, the effective index of refraction varies asymmetrically across the curved waveguide from a value of $n_1$ at $R_1$ to a substantially lower value of $n_2$ at $R_2$, it being noted that the value of $n_2$ approaches the value of the index of refraction in the surrounding material ($n_o$) for sufficiently large values of $R_2$ and small values of delta n. When $n_2$ equals $n_o$, the guided mode is phase velocity matched to the substrate radiation modes and bending loss occurs.

That is, if the radius is sufficiently sharp $v_o$ becomes equal to the velocity in the material outside of the waveguide 2 and an undesirable coupling of energy out of the waveguide 2 occurs. The amount of energy coupled out of the waveguide per unit length is proportional to the energy in the mode outside the waveguide.

It is therefore an object of the invention to provide an optic waveguide structure having a curved geometry that does not couple a significant portion of the mode energy propagating therethrough to material outside of the waveguide.

It is another object of the invention to provide a method for fabricating an optic waveguide structure having a curved geometry such that the waveguide structure does not couple a significant portion of the mode energy propagating therethrough to material outside of the waveguide.

SUMMARY OF THE INVENTION

The foregoing problems are overcome and the objects of the invention are realized by an optical waveguide structure that includes a substrate having a first index of refraction associated therewith and a waveguide within a surface of the substrate. The waveguide has a width bounded by a first edge and by a second edge. The waveguide further has a radius of curvature associated therewith relative to a point on the surface of the substrate and a second index of refraction.

In accordance with the invention a portion of the substrate material adjacent to and extending away from the edge of the waveguide that is nearer the point on the surface of the substrate than the other edge has a third index of refraction associated therewith. The third index of refraction has a value that is greater than the first index of refraction and less than a value of the second index of refraction. Furthermore, the second index of refraction varies across the width of the waveguide from a least value along the edge farthest from the point on the surface of the substrate to a greatest value along the edge nearest the point on the surface of the substrate.

By example a generally circular or elliptical waveguide is fabricated within a substrate such that the waveguide is surrounded by two different indices of refraction, with the index inside the waveguide ring being greater than the index outside the ring. Thus the difference in index between the waveguide edge and substrate is lower at the inner radius and higher at the outer radius. This results, in combination with a varying index of refraction profile across the waveguide itself, in a tendency to confine the mode energy away from the outer perimeter of the ring where leakage is most likely to occur. As a result the asymmetrical index profile compensates for the curvature of the waveguide, the phase front velocities are made uniform, and the mode energy remains confined within the waveguide.

In accordance with a method of the invention of substantially reducing bending energy loss due to a curvature of an optical waveguide there are disclosed the following steps of: (a) fabricating the waveguide within a surface of a substrate such that the waveguide has a variable index of refraction profile across a width of the waveguide, and (b) modifying an index of refraction of a region of the substrate bounded at least in part by the curvature of the waveguide such that the modified index of refraction is greater than an index of refraction of the substrate. Preferably the steps of fabricating and modifying each include a step of performing an ion exchange process.

Further in accordance with the invention the step of performing an ion exchange process includes the steps of: (a) forming a mask upon the surface of the substrate, the mask having an aperture therethrough having a shape for defining the waveguide, (b) contacting a first portion of the surface of the substrate exposed through the aperture with a chemical agent operable for performing an ion exchange process and for increasing the refractive index of the substrate material within the first exposed portion, (c) removing the mask overlying the region of the substrate bounded at least in part by the curvature of the waveguide, the removal of the mask exposing a second portion of the surface of the substrate, and (d) contacting the first exposed portion and the second exposed portion of the surface of the substrate with the chemical agent thereby further increasing the refractive index of the substrate material within the first exposed portion and increasing the refractive index of the substrate material within the second exposed portion.

BRIEF DESCRIPTION OF THE DRAWINGS

The above set forth and other features of the invention will be made more apparent in the ensuing Detailed Description of the Invention when read in conjunction with the attached Drawing, wherein:

FIG. 1a and FIG. 1b illustrate phase front propagation in a straight section of optical waveguide and in a curved section of optic waveguide, respectively;

FIG. 2a and FIG. 2b illustrate the corresponding actual waveguide index of refraction profiles;

FIG. 3a and FIG. 3b illustrate an effective index of refraction profile for the straight and the curved waveguide of FIG. 1 and FIG. 2;

FIG. 4a illustrates, in accordance with the invention, an actual asymmetric index of refraction profile for a curved waveguide section;

FIG. 4b illustrates an effective index of refraction profile for the curved waveguide section of FIG. 4a;

FIG. 4c is a plan view of a circular waveguide of FIGS. 4a and 4b;

FIGS. 5a, 5b and 5c each illustrate an ion exchange profile obtained in a glass substrate due to a narrow aperture, a wide aperture and a planar aperture, respectively, within a mask;

FIG. 6 illustrates various ion exchange profiles obtained for masks having identical aperture sizes but comprised of a dielectric or a metallic material;

FIGS. 7a and 7b illustrate two steps of a method of the invention of fabricating a curved waveguide having a variable index of refraction profile for substantially reducing bending losses; and FIG. 7c is a plan view of a circular waveguide of FIGS. 7a and 7b.

DETAILED DESCRIPTION OF PREFERRED EMBODIMENTS OF THE INVENTION

This invention describes method and apparatus for reducing or eliminating waveguide losses due to bending. In accordance with the invention a waveguide is fabricated such that the phase fronts in a curved waveguide travel at reduced velocities with respect to the surrounding medium, thereby minimizing coupling out of the waveguide. The invention further teaches the provision of a waveguide having mode energy concentrated in an inner portion of the waveguide further reducing bending losses.

In accordance with the invention and as illustrated in the actual and effective index of refraction profiles of FIGS. 4a and 4b, respectively, this is accomplished by fabricating an optical waveguide to have a greater index of refraction difference, relative to the material external to the waveguide, along the outer radius ($R_2$) than along the inner radius ($R_1$).

The waveguide is formed such that it exhibits an asymmetric index of refraction profile as seen in FIG. 4a and in the plan view of FIG. 4c. In this example a generally circular or elliptical waveguide 2 is fabricated within a substrate 3 such that the waveguide is surrounded by two different indices of refraction, with the index inside the waveguide ring ($n_1$) being greater than the index outside the ring ($n_o$). This results, in combination with the varying index within the waveguide itself, in a tendency to confine the mode energy away from the outer perimeter of the ring where leakage is most likely to occur. As a result, and as seen in the effective index of refraction profile of FIG. 4b, the asymmetrical index of refraction profile compensates for the curvature, the phase fronts are uniform, and the mode energy remains confined within the waveguide.

In regards to fabrication of such a waveguide structure one suitable technique involves ion implantation into the substrate. However, a presently preferred technique is known as ion exchange.

Ion exchange is a technique well suited for preparing waveguides in optical quality materials such as glasses. As seen in FIGS. 5a–5c a region 5 is formed within a substrate 3 by ion exchange through a patterned barrier mask 4. The rate of ion exchange and, hence, the extent of the ion exchanged region 5 is a function of the details of the mask, i.e. the width of an aperture within the mask, the mask thickness and the mask material properties. It is noted that the ion exchanged region 5 will generally exhibit a larger index of refraction than the index of refraction associated with the surrounding substrate 3. However, the ion exchange technique can also be employed to lower the index of refraction.

As seen in FIG. 6 the electrical characteristics of the mask also effect the ion exchange rate. For the apertures 7a and 7b of identical width but formed in a dielectric mask 7 and a metal mask 8, respectively, the resulting ion exchanged regions 7b and 8b, respectively, exhibit different depths into the glass substrate 6. In general, openings in pure metal masks have a larger diffusion coefficient, or faster rate of exchange, than similarly sized openings within dielectric masks. The etch rate characteristics of the film also depends on the material structure, i.e. anodized or partially oxidized dielectric films etch more slowly in standard acid etches than metal films.

The method of the invention exploits these and other characteristics of ion exchange techniques to provide the curved waveguide structure that beneficially eliminates energy losses due to phase velocity differences. That is, certain of the limitations of ion exchange can be circumvented without a requirement that external electrical fields be employed during the ion exchange process.

FIG. 6 illustrates that by combining a dielectric film mask with a metallic film mask the rate of diffusion and, therefor, the waveguide characteristics are spatially varied, thereby enabling optical devices with different characteristics to be made in one ion exchange step.

Alternatively, a multi-step exchange technique is shown in FIGS. 7a and 7b. Such a two step diffusion process readily enables the fabrication of optical waveguides having an asymmetric index of refraction profile. Such waveguides may be made to reduce bending losses in rings, whereby the inner part is exchanged once and the ring waveguide itself is exchanged twice. However, it should be realized that the multi-step ion exchange technique of the invention can also be employed to fabricate other variable geometry devices, such as horn couplers, for matching mode field profiles. That is, the teaching of the invention is not limited to only circular or elliptically shaped waveguides.

There is now described the fabrication of a waveguide having a variably profiled index of refraction characteristic. FIG. 7c is a plan view, not to scale, showing a dielectric mask 7 surrounding a circular metal mask 8. A region between masks 7 and 8 forms an aperture having a width of, for example, 3.0 microns. The overall diameter of the circular pattern may be 15 centimeters. Circular metal mask 8 is preferably an aluminum-based film. A first ion exchange step exchanges the circular region 9 of the substrate. Due to the differences between the electrical conductivity of the metal mask 8 and the the dielectric mask 7 the exchanged region has a variable profile as shown. Suitable ion exchange mediums are salt solutions comprised of potassium nitrate and/or sodium nitrate having 0.5% by weight of silver nitrate.

Alternative (ALT.) solutions include the following:

| ALT. | AgNo₃ | KNO₃ | NiNO₃ |
|---|---|---|---|
| 1 | .5% | 99.5% | 0 |
| 2 | .5% | 0 | 99.5% |
| 3 | .5% | A | B | where A, B are weight per cent of oxide material in glass. Other alternatives involve varing the weight percent of silver (AgNO₃); by example: ¼%, ½%, ¾%, 1%, etc.

After contacting the salt solution with the substrate 6 for a period of time to achieve the desired profile in region 9 the metal mask 8 is etched away and a second ion exchange step is performed in the now essentially planar aperture defined by the dielectric mask 7. This second ion exchange step results in an exchanged region 10 that overlaps the previously exchanged region 9. The ion exchange is accomplished such that the index of refraction ($n_1$) of region 10 is greater than that of the glass substrate ($n_o$) and less than that of the variably profiled index within the region 9. That is, the index profile resembles that of FIG. 4a which is the desired result.

The times required to perform these ion exchange steps are variable and depend strongly on the type of glass used. For example, BK-7 or equivalent borosilicate glasses require approximately 0.25 to approximately 0.5 hours.

Other suitable salt solutions include substantially pure AgNO₃, substantially pure CsNO₃ and LiNO₃, wherein the choice of a suitable salt is a function of the particular glass alkalis.

In accordance with another two step ion exchange method of the invention, a method that employs only a metal mask in contact with the substrate 6, a first step coats the glass substrate 6 with a thin (250 Angstroms to 2000 Angstroms) aluminum film. Other suitable metals include titanium, chrome, etc. A positive photoresist is applied and patterned to form a circular shape. The circular pattern is etched into the underlying metal film using standard photolithographic techniques to form a metal mask having a circular aperture therein. The outer portion of the metal mask, corresponding to the portion labeled as 7 in FIG. 7c, is next selectively anodized using point electrodes in combination with an oxidizing agent such as oxalic acid. As was previously stated, the anodization increases the resistance of the metal mask to a subsequently applied etchant. The structure is immersed in the salt to perform the first ion exchange step. The structure is next re-immersed in the etch and the unanodized aluminum area, corresponding to the circular region shown as 8 in FIG. 7c, is selectively removed. The structure is placed once more in the salt bath to exchange the central region shown as 10 in FIG. 7b, thereby producing the desired index of refraction profile.

While the invention has been particularly shown and described with respect to presently preferred embodiments thereof, it will be understood by those skilled in the art that changes in form and details may be made therein without departing from the scope and spirit of the invention.

What is claimed is:

1. A curved optical waveguide formed within a substrate and exhibiting a minimal bending energy loss for a guided mode, the waveguide being characterized as having a varying index of refraction profile across a width of the waveguide and having a greatest index of refraction along a first curved edge that bounds a first region of the substrate, the index of refraction along the first curved edge exceeding an index of refraction of the first region of the substrate bounded thereby, further having a least index of refraction along a second curved edge that bounds the waveguide and the first substrate region, the index of refraction along the second curved edge exceeding an index of refraction of a second region of the substrate adjacent to the waveguide and extending away from the second curved edge, the index of refraction of the first substrate region exceeding the index of refraction of the second substrate region, the difference between the index of refraction of the waveguide at the second curved edge and the index of refraction of the adjacent second substrate region exceeding the difference between the index of refraction of the waveguide at the first curved edge and the index of refraction of the bounded first substrate region.

2. A curved optical waveguide as set forth in claim 1 wherein the varying index of refraction profile has a shape predetermined to provide a substantially uniform effective index of refraction profile to a guided mode.

3. An optical waveguide structure comprising:
a substrate having a first index of refraction associated therewith; and
an optical waveguide within a surface of the substrate, the waveguide having a width bounded by a first edge and by a second edge, the waveguide further having a radius of curvature associated therewith relative to a point on the surface of the substrate, the waveguide also having a second index of refraction associated therewith; wherein
a portion of the substrate adjacent to and extending away from the edge of the waveguide that is nearer the point on the surface of the substrate than the other edge has a third index of refraction associated therewith, and wherein the third index of refraction has a value that is greater than the first index of refraction and less than the second index of refraction, and wherein the second index of refraction varies across the width of the waveguide from a greatest value along the edge nearest the point on the surface of the substrate to a least value along the edge farthest from the point on the surface of the substrate, the difference between the index of refraction of the waveguide along the edge farthest from the point on the surface of the substrate and the first index of refraction exceeding the difference between the index of refraction of the waveguide along the edge nearest the point on the surface of the substrate and the third index of refraction.

4. An optical waveguide structure as set forth in claim 3 wherein the waveguide surrounds a portion of the surface of the substrate, and wherein the surrounded portion of the substrate surface has the third index of refraction associated therewith.

5. An optical waveguide structure as set forth in claim 3 wherein the waveguide has a circular or an elliptical plan shape and wherein a portion of the substrate surrounded by the waveguide has the third index of refraction associated therewith.

6. An optical waveguide structure as set forth in claim 3 wherein the substrate is comprised of optical glass and wherein the waveguide is region within the surface of the substrate that has been modified by an ion exchange technique for increasing the index of refraction therein.

7. A method of substantially reducing bending energy loss due to a curvature of an optical waveguide comprising the steps of:
fabricating the waveguide within a surface of a first substrate region such that the waveguide has a variable index of refraction profile across a width of the waveguide, the variable index of refraction having a least value at a first edge of the waveguide width adjacent to the first substrate region, the least value of the variable index of refraction exceeding an index of refraction of the adjacent first substrate region, the variable index of refraction further having a greatest value at a second edge of the waveguide width bounding at least in part a second substrate region, the greatest value of the variable index of refraction exceeding an index of refraction of the bounded second substrate region; and
modifying the index of refraction of the second region of the substrate bounded at least in part by the second edge of the waveguide width such that the modified index of refraction is greater than the index of refraction of the first substrate region and is less than the greatest value of the variable index of refraction of the waveguide at the second edge of the waveguide width, the difference between the least value of the variable index of refraction at the first edge of the waveguide width and the index of refraction of the adjacent first substrate region exceeding the difference between the greatest value of the variable index of refraction at the second edge of the waveguide width and the modified index of refraction of the bounded second substrate region.

8. A method as set forth in claim 7 wherein the steps of fabricating and modifying each include a step of performing an ion exchange process.

9. A method as set forth in claim 8 wherein the ion exchange process includes a step of contacting a surface of the substrate with a salt solution.

10. A method as set forth in claim 9 wherein the ion exchange process includes a step of contacting a surface of the substrate with a salt solution comprised of a material or materials selected from the group consisting essentially of $AgNO_3$, $KNO_3$, $NaNO_3$, $CsNO_3$, $LiNO_3$ and combinations and variations thereof.

11. A method as set forth in claim 8 wherein the step of performing an ion exchange process includes the steps of:
forming a mask upon the surface of the substrate, the mask having an aperture therethrough having a shape for defining the waveguide;
contacting a first portion of the surface of the substrate exposed through the aperture with a chemical agent operable for performing an ion exchange process and for increasing the refractive index of the substrate material within the first exposed portion;
removing the mask overlying the region of the substrate bounded at least in part by the curvature of the waveguide, the removal of the mask exposing a second portion of the surface of the substrate; and
contacting the first exposed portion and the second exposed portion of the surface of the substrate with a chemical agent operable for performing the ion exchange process thereby further increasing the refractive index of the substrate material within the first exposed portion and increasing the refractive index of the substrate material within the second exposed portion.

12. A method as set forth in claim 11 wherein the step of forming a mask includes the steps of:
depositing a layer of metal upon the surface of the substrate;
patterning the metal layer to form the aperture therethrough; and
anodizing a portion of the metal layer to increase its resistance to an acid etchant.

13. A method as set forth in claim 12 wherein the step of removing the mask includes a step of etching the mask with an acid to remove only the unanodized portion of the mask.

14. A method as set forth in claim 11 wherein the step of forming a mask includes the steps of:
depositing a layer of dielectric material upon the surface of the substrate to form a first portion of the mask; and
depositing a layer of metal upon the surface of the substrate to form a second portion of the mask such that the aperture is formed between the first and the second portions of the mask.

15. A method as set forth in claim 14 wherein the step of removing the mask includes a step of removing only the second, metal portion of the mask.

16. A method as set forth in claim 12 wherein the deposited metal is selected from the group consisting essentially of aluminum, titanium, chrome and variations and combinations thereof.

* * * * *